No. 876,189. PATENTED JAN. 7, 1908.
F. A. INGERSOLL.
COMBINED CORN HARVESTER AND HUSKER.
APPLICATION FILED DEC. 29, 1906.
5 SHEETS—SHEET 1.
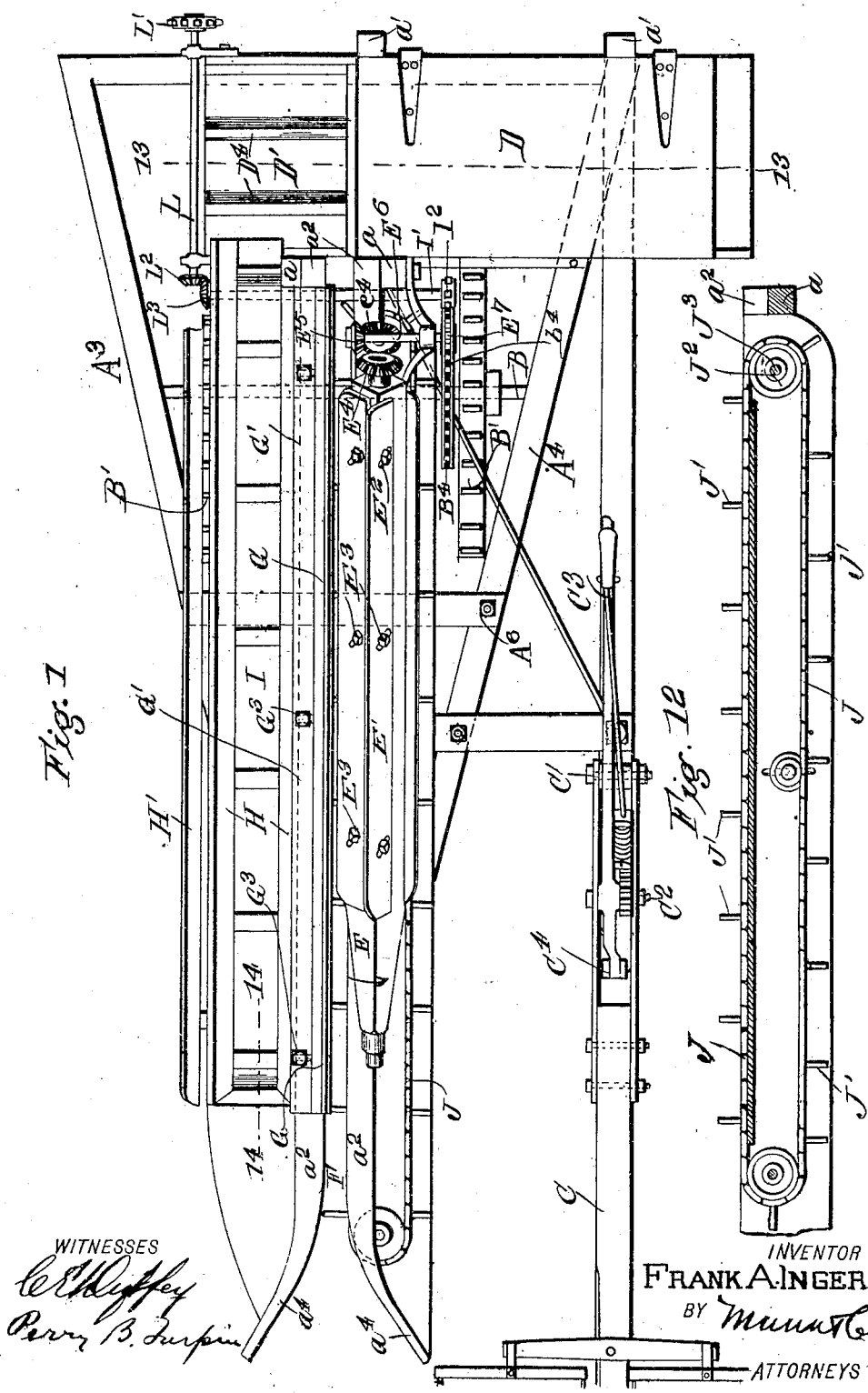
WITNESSES
INVENTOR
FRANK A. INGERSOLL
BY
ATTORNEYS

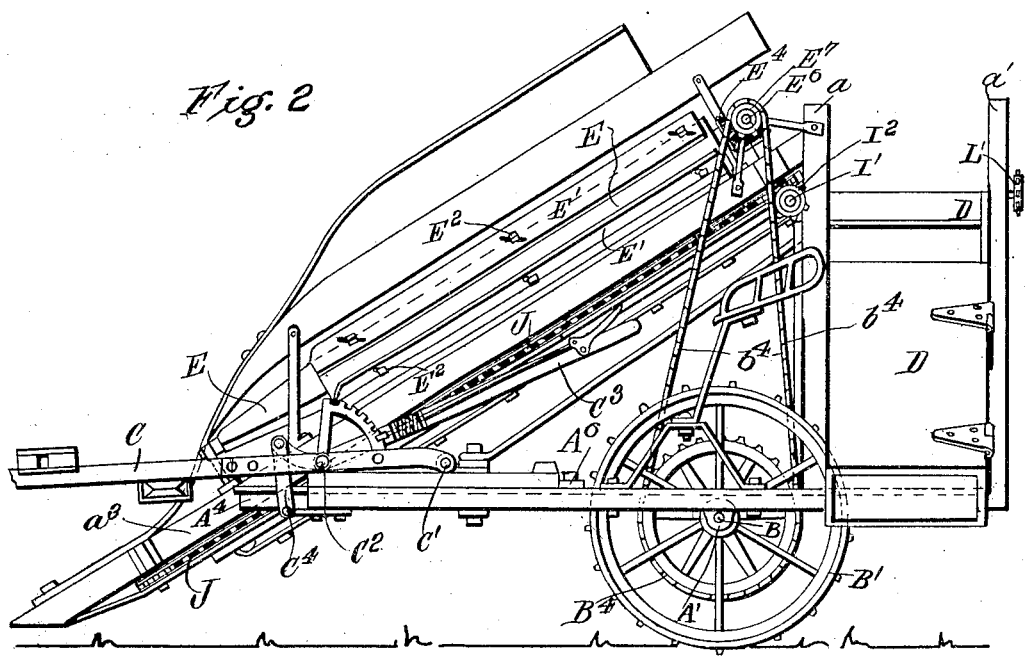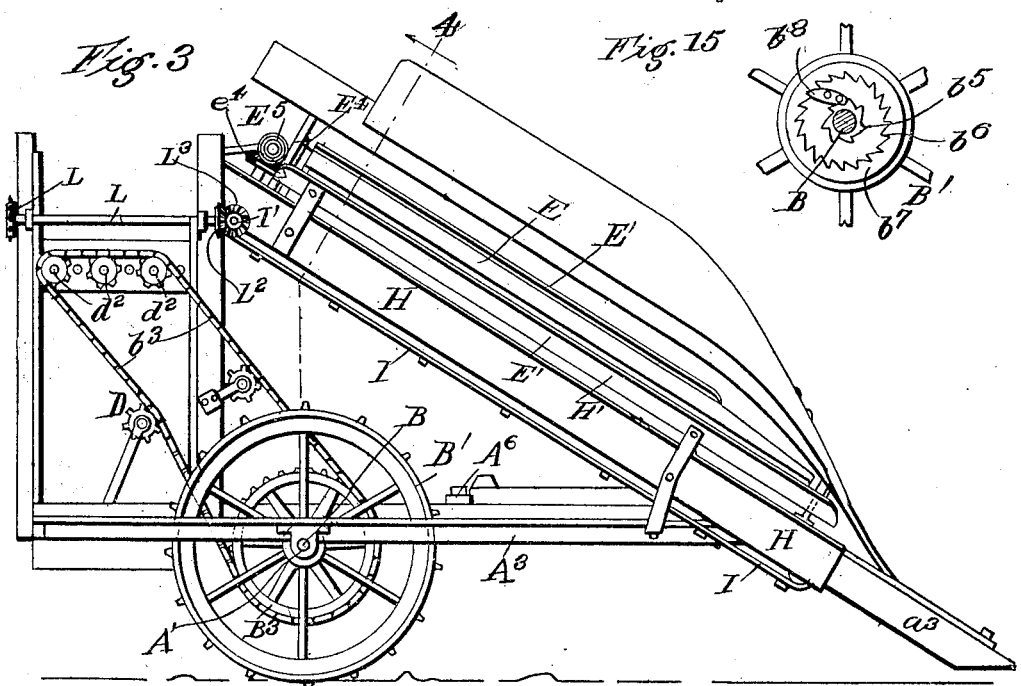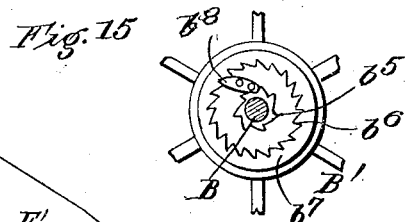

No. 876,189. PATENTED JAN. 7, 1908.
F. A. INGERSOLL.
COMBINED CORN HARVESTER AND HUSKER.
APPLICATION FILED DEC. 29, 1906.
5 SHEETS—SHEET 3.
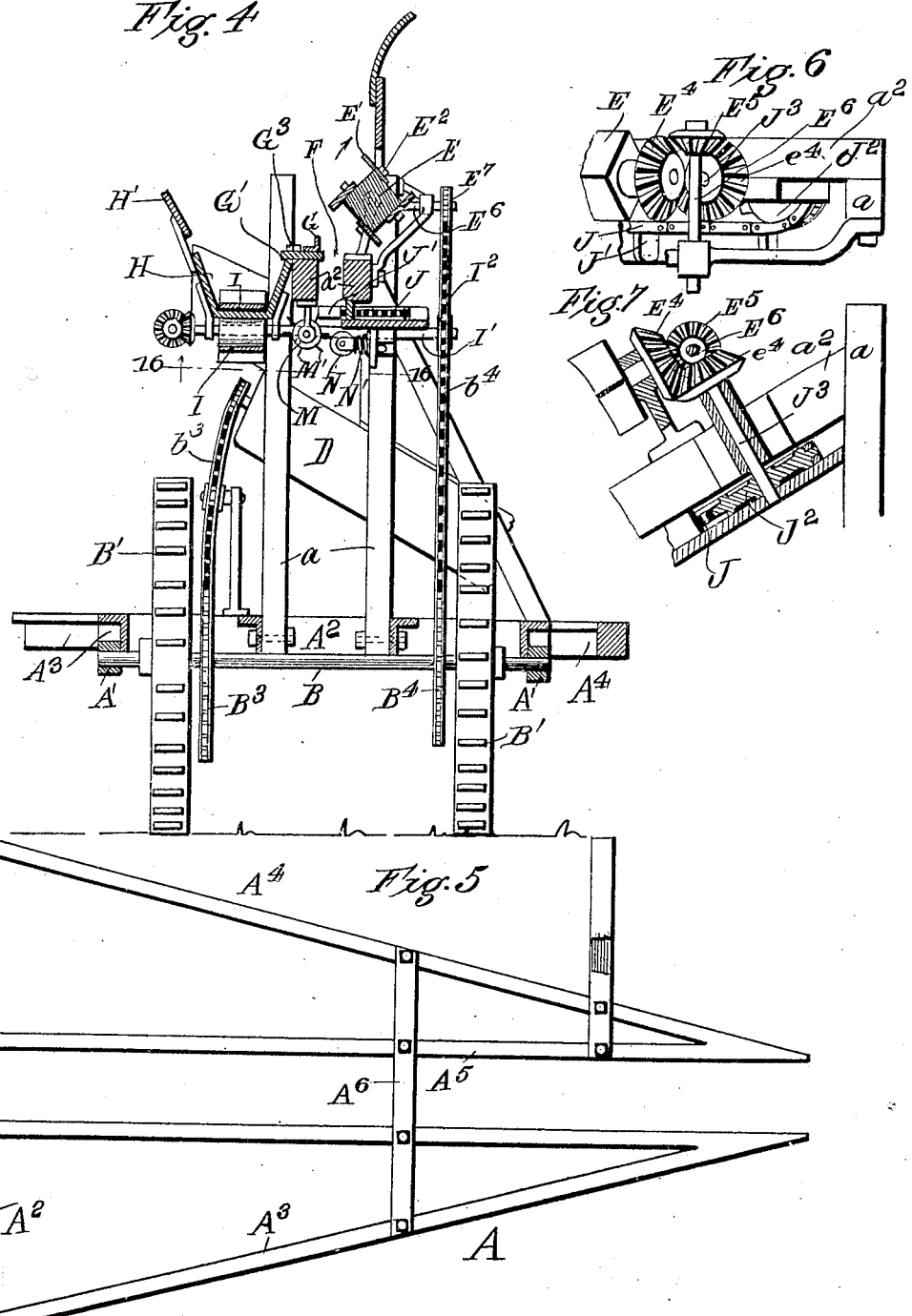
INVENTOR
FRANK A. INGERSOLL

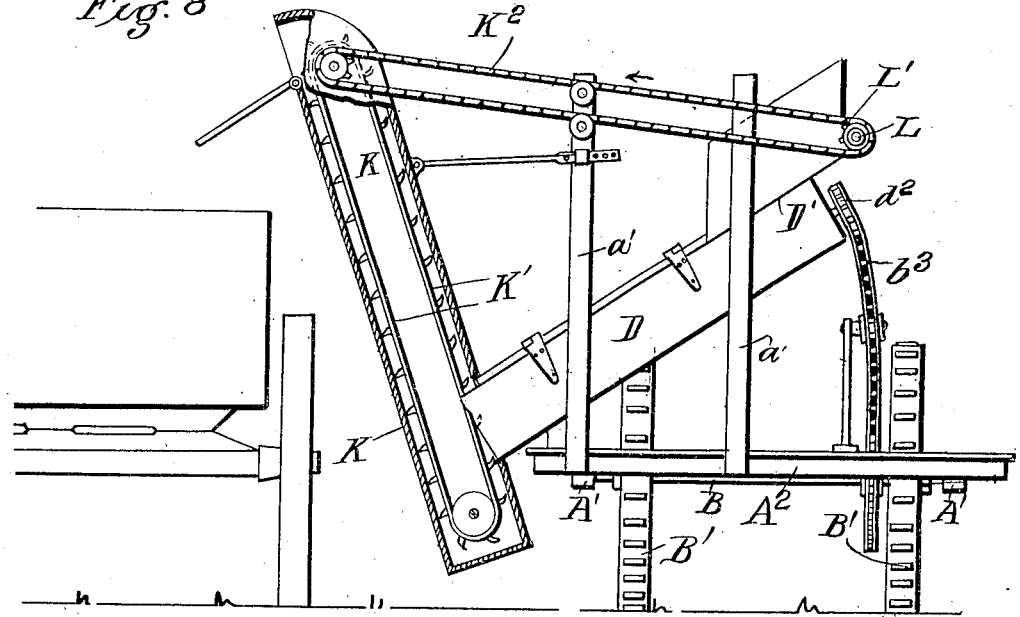
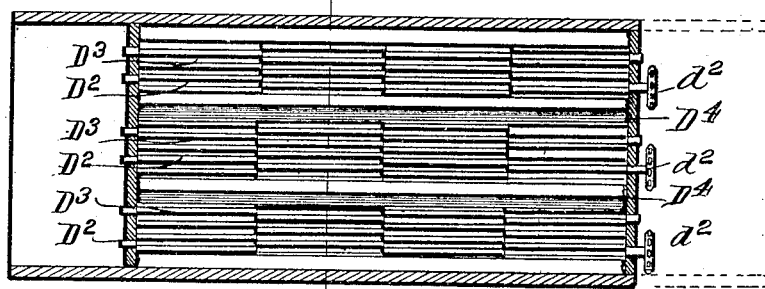
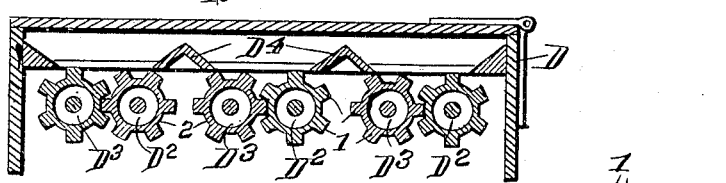

No. 876,189. PATENTED JAN. 7, 1908.
F. A. INGERSOLL.
COMBINED CORN HARVESTER AND HUSKER.
APPLICATION FILED DEC. 29, 1906.
5 SHEETS—SHEET 5.
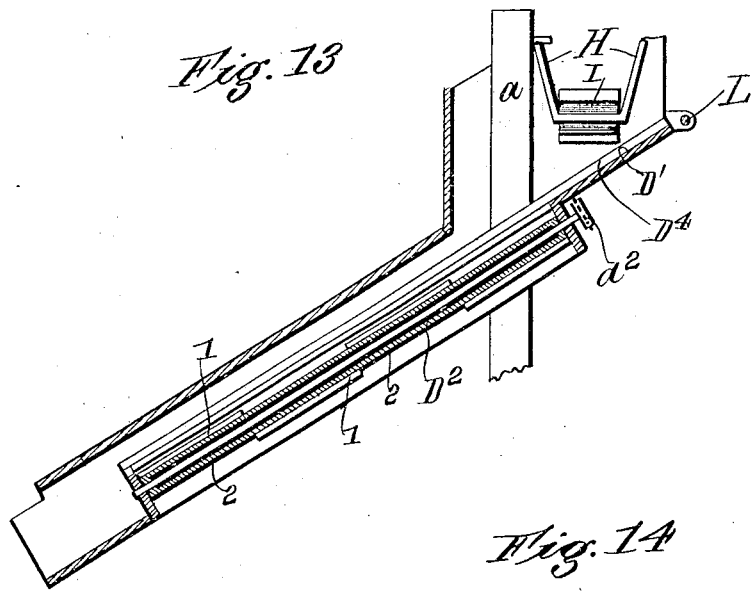
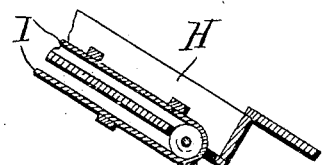
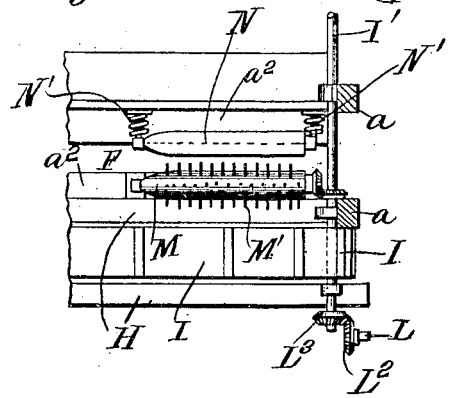
WITNESSES
INVENTOR
FRANK A. INGERSOLL
BY
ATTORNEYS

UNITED STATES PATENT OFFICE.

FRANK A. INGERSOLL, OF NEW YORK, N. Y.

COMBINED CORN HARVESTER AND HUSKER.

No. 876,189.  Specification of Letters Patent.  Patented Jan. 7, 1908.

Application filed December 29, 1906. Serial No. 349,978.

*To all whom it may concern:*

Be it known that I, FRANK A. INGERSOLL, a citizen of the United States, and a resident of New York, in the county of New York and State of New York, have invented certain new and useful Improvements in a Combined Corn Harvester and Husker, of which the following is a specification.

My invention is an improvement in combined corn harvesters and huskers, and consists in certain novel constructions and combinations of parts as will be hereinafter described and claimed.

In the drawings Figure 1 is a top plan view of a machine embodying my invention. Fig. 2 is a side elevation thereof from one side of the machine. Fig. 3 is an elevation from the other side of the machine. Fig. 4 is a cross section on about line 4—4 of Fig. 3. Fig. 5 is a detail plan view of a portion of the framing. Figs. 6 and 7 illustrate the gearing for driving the batter. Fig. 8 is a vertical cross-section illustrating the elevator mechanism for discharging the husked ears into a wagon. Fig. 9 is a sectional view illustrating the husking rolls. Fig. 10 is a cross-section on about line 10—10 of Fig. 9. Fig. 11 is a detail perspective view of one of the husking rolls. Fig. 12 is a sectional view illustrating one of the endless chains for carrying the corn stalks rearwardly through the machine. Fig. 13 is a vertical section on about the line 13—13 of Fig. 1 through the husker. Fig. 14 is a detail section on about line 14—14 of Fig. 1 illustrating the carrier for elevating the ears to the husker. Fig. 15 is a detail view illustrating the clutch on the drive wheels, and Fig. 16 is a sectional bottom plan view on about line 16—16 of Fig. 4 showing the rolls for pulling down any stalks that break off or pull up and are carried to the upper end of the gathering bars.

In carrying out my invention I employ a suitable framing having a base portion A provided with bearings A' for the axle B provided with the wheels B' which may be clutched to the axle B preferably by the construction shown in Fig. 15, although any other suitable clutch mechanism may be employed if desired. On this axle B are secured sprocket wheels $B^3$ and $B^4$ for driving, through suitable chains $b^3$ and $b^4$, moving parts of the machine more fully described hereinafter.

The base portion A of the framing may be made of angle metal, as illustrated in Fig. 4, and comprises a rear bar $A^2$, side bars $A^3$ and $A^4$ which are connected at their rear ends with the rear bar $A^2$ and converge toward their forward ends and are spaced apart at such forward ends to form a guide-way for the stalks and the guide bars $A^5$ extend rearwardly from the front ends of the side bars $A^3$ and $A^4$ to the rear cross-bar $A^2$ and are connected at a suitable point in front of their rear ends by a cross-bar $A^6$ which operates to depress the stalks after the snapping devices have properly operated upon the ears of corn. This cross-bar $A^6$ is located relatively to the batter presently described, as shown in Figs. 1 and 2 of the drawings. The purpose of this cross-bar $A^6$ is to depress the standing stalks as or after the ears have been removed therefrom so the stalks will not interfere with the gearing and other parts at the rear of the machine.

At one side the base portion of the main frame has pivoted to it at C' the rear end of the tongue C and to this tongue C is pivoted at $C^2$ a hand lever $C^3$ extending in advance of its pivot $C^2$ and connected at its front end by a link $C^4$ with the front end of the main frame so the lever $C^3$ may be operated to adjust the tongue and main frame relatively to each other in order to set the front end of the main frame at any desired height and the tongue and main frame may be secured in any suitable relation by means of the ratchet and pawl mechanism $C^5$ best illustrated in Fig. 2 of the drawings.

At the rear end of the base portion A of the main frame I provide the upright portion having front posts $a$ and rear posts $a'$ between which is supported the husker D and inclined bars $a^2$ connected at their upper ends with the posts $a$ and extending thence downwardly past a connection with the front end of the base portion A and extending below the base portion of the frame at their lower front ends at $a^3$ to a point at a sufficient height above the ground to properly receive the stalks and are provided at their front ends with the diverging gathering arms $a^4$ to aid in directing the stalks into the gatherer. This main frame supports the moving parts of the machine and in suitable bearings above what for convenience of reference I term the inner bar $a^2$ I support a batting roller E arranged at an incline corresponding to the gathering bar $a^2$ suitably driven as presently described and provided with the longitudinally extending blades E' which project tangentially as best shown in Fig. 4 of the drawing, and are connected adjustably with the roller by bolts $E^2$ passing through slotted openings $E^3$ in the blades as shown in Fig. 1 of the drawings.

At its rear upper end the roller E has a bevel gear $E^4$ meshing with an intermediate bevel gear $e^4$ which in turn meshes with a bevel gear $E^5$ on a shaft $E^6$ provided with a sprocket $E^7$ driven by a chain $b^4$ from the sprocket $B^4$ on the axle B. This gearing, is illustrated in Figs. 1, 2 and 3 of the drawings and by it the batting roller E is caused to operate in the direction indicated by the arrow in Fig. 4 of the drawings. This batter E it will be noticed operates at one side of the slot or passageway F through which the stalks pass and at the opposite side of this passageway F and preferably upon the outer inclined bar $a^2$ I provide an upwardly projecting flange or lip G upon which the lower end of the ears of corn will engage when struck by the blades E' of the batter E so the batter will snap the ears off on the snapping flange G and such ears will be deposited in the trough H extending upwardly along the outer side of the gatherer and discharging at its upper rear end H' to the husker D. One run of the ear carrier I operates upwardly in the bottom of the trough and carries the ears upwardly to the discharge H' and this carrier is driven from a shaft I' having a sprocket wheel $I^2$ driven by the sprocket chain $b^4$, as shown in Figs. 2 and 4 of the drawings. It will be noticed that the batting roller E extends above the inner inclined bar $a^2$, see Fig. 4, and below this bar I arrange the stalk carrier J extending below the bar $a^2$ and provided with outwardly projecting pins or fingers J' which extend across the passageway F and operate to carry the stalks upwardly to points where the ears will rest upon the snapping flange G and be broken off by the batter E and be delivered thereby to the trough H in the operation of the invention. This stalk carrier J extends from a point nearly at the lower end of the gatherer upwardly, and is driven at its upper end by the sprocket wheel $J^2$ on a shaft $J^3$ carrying the intermediate bevel gear $e^4$ which meshes with and drives the batting roll E, as best shown in Fig. 7 of the drawings. An elevated side board H' extending along the outer side of the trough H operates to catch any ears that might otherwise be driven over the said trough H in the operation of the machine.

In the operation of the machine, as before described, it will be noticed that provision is made for adjusting the main frame relatively to the tongue so as to raise and lower the front ends of the gathering devices, that the stalk carrier is provided for moving the stalks rearwardly within the slotted passageway provided therefor, that the husking roller is extended above and to one side of the said slot or passageway and that a snapping flange is extended above the passageway at the opposite side from the batting roller to form a bearing for the lower end of the ear, and that said ear is delivered by the batting roller into an upwardly inclined trough having an ear carrier which delivers the ears to the husker, suitable gearing being provided for effecting the operation of the several parts.

I will now proceed to a description of the husking devices. The husker D comprises a suitable box or casing inclining downwardly from its upper end as shown in Fig. 8 and receiving at its upper end the ears delivered by the ear carrier I operating in the trough H as shown in Fig. 13. At its upper end the husker has a table D' on which the ears are delivered and pass thence to the husking rolls $D^2$ and $D^3$ which incline downwardly from their upper to their lower ends and are arranged to operate in pairs as best shown in Figs. 9 and 10 of the drawings, the rolls $D^2$ being driven by suitable gearing and the rolls $D^3$ being driven by the rolls $D^2$. The rolls $D^2$ are provided at their ends with sprocket wheels $d^3$ which are driven by a sprocket chain $b^3$ disposed as shown in Fig. 4 of the drawings and driven from the sprocket wheel $B^3$ on the axle. By this construction the rolls $D^2$ are all turned in the same direction and ears of corn received between the rolls $D^2$ and $D^3$ will be husked by the operation of the said rolls toward each other as the ears pass downwardly to the lower end of the husker. To direct the ears to the points between two coöperating rolls $D^2$ and $D^3$ I provide slats $D^4$ extending longitudinally between the adjacent pairs of rolls and forming hoppers discharging to the coöperating rolls as best shown in Fig. 10 of the drawings.

The rolls are formed as shown in Figs. 9, 10 and 11 and are ribbed or fluted longitudinally. The ribs 1 of the rolls are arranged in sections and are disposed alternately to the ribs of the adjacent sections as best shown in Fig. 11 so that the ribs 1 of one section will be in line with the spaces 2 between the ribs 1 of the adjoining section and the coöperating roll is correspondingly formed so that as the ears travel downwardly over the coöperating rolls and over the faces thereof which turn toward each other, I am able to engage with projecting ribbons or portions of the husks on one or the other side of the ear so that all portions of the husks are certain to be removed by the operation of the rollers.

At its lower end the husker D delivers the husked ears to the elevator K having the carrier K' by which the ears are conveyed upwardly and delivered to a wagon or other receptacle running alongside the machine. The elevator is operated by a sprocket chain $K^2$ driven by a sprocket wheel L' on a shaft L having a bevel gear L² meshing with a bevel gear L³, see Fig. 1, on the shaft I', which shaft is driven by the sprocket chain b⁴ operating upon the sprocket wheel I² as shown in Figs. 1 and 2 of the drawings.

The clutch mechanism shown in Fig. 15 comprises a ratchet wheel b⁵ on the shaft B and a ratchet ring b⁶ on the inner face of the hub b⁷ of the wheel B' and a click pawl b⁸ operating between the said ratchets in an ordinary manner. This clutch mechanism is not claimed to be of my invention and need not be described further herein.

In Fig. 16 I illustrate a means provided for depressing or pulling down any stalks that may break off or be pulled up out of the ground and carried upwardly in the passageway F to the top of the machine where they might accumulate and clog the working parts. This mechanism comprises a pair of rolls M and N extending on opposite sides of the passageway F at the upper end thereof. The roller M is driven by gearing from the shaft I' as shown in Fig. 16 and is provided with projecting teeth M' which will engage with and force the stalks downwardly. The roller N is an idler and extends opposite the roller M and its bearings are yieldingly supported by springs N' so it may yield back and forth to adapt it for larger or smaller stalks as will be readily understood. This construction is simple and operates effectually to clear the upper end of the machine from accumulations of stalks, blades, etc. as will be understood by those skilled in the art.

As before described the longitudinally extending tangentially projecting blades of the batting roll are adjustable whereby they may be set to different positions. I also make the upwardly projecting rib or flange G adjustable laterally so the said adjustments of the rib or flange G and of the blades of the batting roll may operate to adapt the machine to crops in which the stalks will differ in size as well as to various sizes of ears, the stalks and ears from some fields or some localities being larger than from others.

In adjusting the rib or flange G it is preferred to mount the same on a movable support, shown as a board G', mounted upon and movable laterally on its gathering bar a² and slotted at G² for the bolts G³ which may operate to secure the said board G' in any desired adjustment. By the described construction it will be noticed I provide for adjusting the positions of the batting roll and the rib or flange G independently to adapt them to efficiently serve the purpose for which they are designed.

The husker herein described will form the subject matter of a separate application for patent which I have executed and am about to file in the Patent Office.

I claim—

1. The combination in a corn harvester, of a main frame having a base portion and an upright portion at the rear end thereof and comprising front and rear posts and also having inclined gathering bars extending downwardly from the upright rear portion to and below the front end of the base portion, said gathering bars being spaced apart forming a passageway for the stalks, a batting roller extending above one of the said gathering bars, an upwardly projecting lip or flange on the other gathering bar and adapted to form a rest or seat for engagement by the lower end of an ear of corn, a trough extending upwardly along the outer side of the bar having the said lip or flange, an ear carrier operating upwardly within said trough, a stalk carrier operating below the gathering bar above which the batting roll operates, a husker arranged between the front and rear posts of the upright portion of the main frame and having husking devices, and means for operating the snapping roll, ear carrier, stalk carrier and husking devices, all substantially as and for the purposes set forth.

2. A corn harvester having a slot or passageway for the stalks, a batting roll inclining upwardly from its front to its rear end at one side of said passageway and an upwardly projecting rib or flange inclining upwardly from its front to its rear end on the opposite side of the passageway and adapted to form a seat or bearing for the lower end of an ear of corn whereby the batter may operate in connection with said flange to snap the ear from the stalk substantially as set forth.

3. The combination in a corn harvester having a slot or passageway for the stalks, of a carrier operating at one side of the passageway and having pins or projections entering the passageway to engage with the stalks, a batting roll inclining upwardly from its front to its rear end above and to one side of the passageway and an upwardly projecting rib or flange inclining upwardly from its front to its rear end on the opposite side of the passageway from the batting roll and adapted to form the seat or bearing for the lower end of an ear of corn whereby it may be snapped from the stalk by the operation of the batting roll and a trough inclining upwardly and rearwardly on the opposite side of the rib or flange from the said batting roll, substantially as and for the purpose set forth.

4. The combination in a corn harvester of upwardly and rearwardly inclined gathering bars spaced apart forming a slot or passageway for corn stalks, a stalk carrier operating below one of said gathering bars, a batting roller operating above the other gathering bar and an upwardly projecting rib or bead above the other gathering bar and adapted to form a seat or bearing for the lower end of the corn stalk whereby the stalk may be snapped by the operation of the batting roll, and means for operating the batting roll and stalk carrier, substantially as set forth.

5. A corn harvester having a batting roll inclined upwardly toward its rear end and provided with longitudinally extending tangentially projecting blades, and an upwardly projecting rib or bead opposite the said batting roll and adapted to form a seat or bearing for the lower end of an ear of corn whereby it may be snapped by the operation of the batting roll, and supports for said rib or flange and for the batting roll, and means for operating the batting roll, substantially as set forth.

6. The combination in a corn harvester of a main frame having upwardly and rearwardly inclined gathering bars, a trough extending upwardly and rearwardly along the outer side of one of the gathering bars, an upwardly projecting rib or flange on the said gathering bar and adapted to form a seat or bearing for the lower end of the ear of corn and a batting roll above the other gathering bar and adapted to operate upon an ear of corn seated upon the said rib or flange, substantially as set forth.

7. The combination in a corn harvester of upwardly and rearwardly inclined gathering bars, spaced apart forming a slot or passageway for the stalks, a batting roll extending above one of the said gathering bars, a board extending above the other gathering bar and movable relatively thereto whereby it may be adjusted laterally to different positions, means for securing this board in different adjustments, and an upwardly projecting rib or flange on the said board and adapted to form a seat or bearing for the lower end of an ear of corn, substantially as set forth.

8. The combination in a corn harvester with suitable framing and supporting and operating means, of an upwardly and rearwardly inclined batting roll having longitudinally extending tangentially projecting blades adjustable relatively to the roll, means for securing said blades in different adjustments and an upwardly projecting rib or flange opposite the said roll and adapted to form a seat or bearing for the lower end of an ear of corn in the operation of snapping the same, by the batting roll, from its stalk, and a laterally adjustable support for the said rib or flange, substantially as set forth.

9. The combination in a corn harvester of a gatherer forming a slot or passageway for the stalks, a batting roll above the same, and a stalk carrier below the batting roll, a bevel pinion on one end of the batting roll, a cross shaft having a bevel pinion, means for driving the cross shaft, a shaft having an intermediate bevel pinion meshing with the bevel pinion of the cross shaft and also with the bevel pinion of the batting roll, and a sprocket wheel on the shaft of the intermediate gear, and driving the stalk carrier, substantially as set forth.

10. The combination in a corn harvester of upwardly and rearwardly inclined gathering bars spaced apart forming a slot or passageway for the corn stalks, a stalk carrier operating below one of said gathering bars and having pins or fingers extending across the space between the said bars, a batting roll above one of the gathering bars and provided with tangentially projecting blades adjustably connected with the roll, an upwardly projecting rib or flange above the other gathering bar, a laterally adjustable support for said flange, a trough extending upwardly and rearwardly along the outer side of the gathering bar carrying the said flange or rib, an ear carrier operating in said trough, and a husker to which said ear carrier delivers at its upper end, substantially as set forth.

11. In a corn harvester the combination with the gathering bars, the stalk carrier below the same and the snapping device of the rolls M and N at the delivery ends of the gathering bars, one of the rolls having projecting pins or teeth, means for driving said roll, and springs for yieldingly supporting the other roll, substantially as set forth.

12. A corn harvester having a slot or passageway for the stalks and means for feeding the stalks rearwardly therein and a depressor at the rear end of said passageway for the stalks that may break off or pull up, said depressor consisting of a driven roll having teeth or projections and an opposite idler roll, substantially as set forth.

13. The combination in a corn harvester of the upwardly and rearwardly inclined gathering bars, spaced apart for the passage of the stalks, the stalk carrier below one of said bars, the batting roll above one of said bars, a flange or rib on the opposite gathering bar and adapted to form a seat or bearing for the butt end of an ear of corn, and rolls arranged below the gathering bars at their upper ends and adapted to depress or pull down any stalks that may be carried to the upper ends of the gathering bars, substantially as set forth.

FRANK A. INGERSOLL.

Witnesses:
SOLON C. KEMON,
PERRY B. TURPIN